United States Patent Office 2,872,437
Patented Feb. 3, 1959

2,872,437

PRODUCTION OF OIL-SOLUBLE SULFONATES

Everett E. Gilbert and Benjamin Veldhuis, Morris Township, Morris County, N. J., assignors to Allied Chemical Corporation, a corporation of New York No Drawing. Application June 22, 1955
Serial No. 517,354

6 Claims. (Cl. 260—79.3)

This invention relates to the production of oil-soluble sulfonates and more particularly relates to the production of oil-soluble sulfonates resulting from the sulfonation of synthetic petroleum resins.

Until World War II oil-soluble sulfonates were obtained almost exclusively as a by-product of mineral white oil production, involving the drastic treatment of a lubricating oil with oleum or sulfur trioxide. During the war the demand for such sulfonates as lubricating oil additives, rust-proofing compounds, etc., exceeded the supply available from such by-product sources. Accordingly, procedures were developed for producing oil-soluble sulfonates by direct sulfonation of (1) solvent extracts obtained during the production of lubricating oils; (2) dinonylnaphthalene prepared synthetically by reacting nonene (tripropylene) with naphthalene; and (3) "polydodecylbenzene," the high boiling by-product residues obtained in the manufacture of dodecylbenzene detergent alkylate. The molecular weight of the raw materials in these procedures ranges from 341 to 380.

The object of the present invention is to provide a simple and economical process for the production of oil-soluble sulfonates in high yields. Other objects and advantages of the present invention will appear hereinafter.

We have now found that high yields of oil-soluble sulfonates may advantageously be obtained by reacting synthetic petroleum resins having a molecular weight of at least about 800, preferably at least about 1000, with a sulfonating agent.

By synthetic petroleum resins we mean any resin formed by polymerization with the aid of a catalyst such as aluminum chloride of a highly unsaturated liquid obtained by cracking oils such as gas oils and the like and fractionating the cracked product. A particularly suitable synthetic petroleum resin is prepared by the polymerization of a highly unsaturated liquid fraction composed essentially of $C_5$, $C_6$ and $C_7$ hydrocarbons and predominating in the $C_7$-type. Half or more of the fraction comprises aromatic, olefinic and conjugated diene hydrocarbons, of which the last two named are highly reactive polymerization reactants. The balance of the fraction, also highly unsaturated, contains olefines of lesser polymerization activity. Conjugated diene content of the fraction is usually about 15% or more by weight of the fraction.

As indicated above, synthetic petroleum resins having molecular weights of at least about 800, preferably at least about 1000, may be used as starting materials in the process of the present invention. Use of resins having substantially lower molecular weights has generally resulted in poor yields of sulfonated products.

Any of the usual sulfonating agents such as sulfur trioxide, concentrated sulfuric acid, fuming sulfuric acid or chlorosulfonic acid may be employed. Since use of sulfur trioxide involves little or no waste of sulfonating agent, it constitutes the preferred agent.

The extent of sulfonation may be controlled by varying the ratio of sulfonating agent to synthetic petroleum resin. In order to realize maximum yields of oil-soluble sulfonate product, the sulfonating agent is employed in such amount that its sulfur trioxide equivalent ranges from about 0.75 to 2.5 mols per mol of synthetic petroleum resin, and preferably from about 1.0 to 2.0 mols per mol of resin.

The sulfonating agent is added to the synthetic petroleum resin at temperatures ranging from about 10° to 60° C., suitably at room temperature. Since, however, the reaction is exothermic, the temperature generally rises about 5° to 20° C. during the reaction.

When sulfur trioxide is employed as the sulfonating agent, it is desirably suspended in an inert carrier gas. These gases include air, nitrogen, carbon dioxide, sulfur dioxide, etc. The concentration of sulfur trioxide in the inert gas is preferably about 50 to 95% by volume.

The sulfonation reaction is conveniently carried out by dissolving the petroleum resin in a suitable inert solvent. Such solvent should not react with the sulfonating agent and should be readily separable from the final reaction product, for example, by fractionation. Hexane and related materials such as naphtha and petroleum ether are preferred as solvents since they are inexpensive and give no processing difficulty. Other solvents which may be used include tetrachloroethylene, trichlorofluoromethane and nitrobenzene. The amount of solvent used is not critical although there must be enough solvent present for easy control of the reaction.

Depending upon the temperature employed, the total reaction period usually varies from about 5 to 150 minutes. Generally, a reaction period of 10 to 30 minutes is adequate.

After the reaction is complete, the product which is in sulfonic acid form may be neutralized with any suitable base, for example, caustic soda, caustic potash, ammonia, amines and the like, and the sulfonate salt can be recovered by any suitable procedure as by distillation.

We have found that in the process of the present invention about 1 mol of sulfonating agent as sulfur trioxide equivalent reacts with 1 mol of synthetic petroleum resin to form monosulfonated products. The products either in the form of sulfonic acids or their neutralized salts are soluble in oils such as hexane and other organic solvents and are insoluble in water. They find use in manner similar to other oil-soluble sulfonates as lubricating additives, emulsifiers, rust-proofing compounds, etc.

In the preferred procedure, a synthetic petroleum resin having a molecular weight of at least about 1000 is dissolved in a suitable solvent such as hexane. Sulfur trioxide vapors are then reacted with the resin, in mol ratio of about 1.0 to 2.0 mols of sulfur trioxide to 1 mol of resin, in a stream of a suitable inert gas such as nitrogen over a period of about 10 to 30 minutes. The reaction is carried out at about room temperature (about 20° to 30° C.), but during the reaction the temperature generally rises to about 40° to 45° C. The mixture may then be digested for about 30 to 60 minutes to complete the reaction. However, the digestion step is not essential to obtain good results. There is produced a mixture containing a hexane layer and separated sludge. The hexane layer is decanted from the separated sludge and contains oil-soluble sulfonate. The sulfonate product is then neutralized, for example, with aqueous caustic soda solution. The remaining hexane is removed by distillation, preferably in vacuo. To obtain a substantially dry product, a suitable azeotrope former such as benzene is added and a benzene-water azeotrope is distilled out, preferably in vacuo.

The following specific examples further illustrate our invention.

*Example 1.*—110 grams of Piccopale 100 (a synthetic petroleum resin having a molecular weight of 1100 and prepared by the polymerization of a highly unsaturated liquid fraction composed essentially of $C_5$, $C_6$ and $C_7$ hydrocarbons of the character described above) were dissolved at room temperature (29° C.) in 207 grams of hexane in a reaction flask equipped with an agitator. 16 grams of sulfur trioxide vapors were passed into the flask in a stream of nitrogen during a 10 minute period. The temperature rose to 40° C. during the reaction period, and the mixture was then digested for 30 minutes to complete the reaction. A mixture containing a hexane layer and separated sludge resulted. The hexane layer was decanted from the separated sludge. The hexane solution was found by titration to contain 52 milliequivalents of sulfonic acid compound per 100 grams of resin fed. For simplicity and as a measure of the degree of sulfonation of the resin, this amount of sulfonic acid compound represents about 57 mol percent of monosulfonated resin of molecular weight of 1100. Thus, it can be seen that about 57 percent of the original resin molecules were sulfonated.

Several additional runs were made in a manner similar to that described above. In some cases the sulfonic acid compound was converted to the corresponding sodium salt by reaction with 20% aqueous caustic soda solution. After neutralization, the hexane was removed by distillation in vacuo. Benzene was then added and distilled out in vacuo. These runs may be summarized by the table below:

While we have described preferred embodiments for carrying out the process of our invention, it will be apparent that many changes may be made without departing from the spirit of the invention.

We claim:
1. The process of preparing oil-soluble sulfonates which comprises reacting a synthetic petroleum resin having a molecular weight of at least about 800, said resin being formed by aluminum chloride catalyzed polymerization of a highly unsaturated liquid fraction obtained by cracking a liquid petroleum oil and fractionating the cracked product, said fraction being composed essentially of $C_5$, $C_6$ and $C_7$ hydrocarbons comprising aromatic hydrocarbons, olefinic hydrocarbons and conjugated diene hydrocarbons, the conjugated diene hydrocarbons comprising at least about 15% by weight of the fraction, with a sulfonating agent, in mol ratio of about 0.75 to 2.5 mols of sulfonating agent per mol of resin, at temperature of about 10° to 80° C. for a time sufficient to complete the reaction.

2. The process of preparing oil-soluble sulfonates which comprises reacting a synthetic petroleum resin having a molecular weight of at least about 1000, said resin being formed by aluminum chloride catalyzed polymerization of a highly unsaturated liquid fraction obtained by cracking a liquid petroleum oil and fractionating the cracked product, said fraction being composed essentially of $C_5$, $C_6$ and $C_7$ hydrocarbons comprising aromatic hydrocarbons, olefinic hydrocarbons and conjugated diene hydrocarbons, the conjugated diene hydrocarbons comprising at least about 15% by weight of the fraction, with a sulfonating agent, in mol ratio

| Example No. | Resin, M. Wt. 1,100 | | $SO_3$ | | Hexane (Gms.) | Time (Minutes) | | Temp., °C. | Titration [1] | Yield: Sulfonic Acid Compound (Mol percent) | Yield: Na Salt Based on Basin Fed (Wt. percent) |
|---|---|---|---|---|---|---|---|---|---|---|---|
| | Gms. | Mols. | Gms. | Mols | | Sulfonation | Digestion | | | | |
| 2 | 110 | 0.1 | 8 | 0.10 | 200 | 10 | 60 | 30–42 | 91 | 100 | 107 |
| 3 | 110 | 0.1 | 16 | 0.2 | 200 | 15 | 60 | 30–38 | 58 | 64 | |
| 4 | 202 | 0.18 | 18 | 0.23 | 402 | 15 | 60 | 30–35 | 51 | 57 | 104 |
| 5 | 550 | 0.5 | 60 | 0.75 | 1,000 | 30 | 120 | 30–35 | 73 | 80 | |

[1] Milliequivalents of acidity as sulfonic acid compound per 100 gms. resin fed.

*Example 6.*—137.5 grams of a synthetic petroleum resin having a molecular weight of 550 were dissolved at temperature of 24° C. in 250 grams of hexane in a reaction flask supplied with an agitator. 20 grams of sulfur trioxide vapors were passed into the flask in a stream of nitrogen during a 15 minute period. The temperature rose to 40° C. during the reaction period, and the mixture was digested for 60 minutes to complete the reaction. The resulting hexane layer was decanted from separated sludge and was found by titration to contain only 31 milliequivalents of sulfonic acid compound per 100 grams of resin fed, which corresponded to a yield of about 17 mol percent.

*Example 7.*—In this run a synthetic petroleum resin having a molecular weight of 390 was sulfonated. The run is summarized below:

of about 0.75 to 2.5 mols of sulfonating agent per mol of resin, at temperature of about 10° to 80° C. for a time sufficient to complete the reaction.

3. The process of preparing oil-soluble sulfonates which comprises reacting a synthetic petroleum resin having a molecular weight of at least about 1000, said resin being formed by aluminum chloride catalyzed polymerization of a highly unsaturated liquid fraction obtained by cracking a liquid petroleum oil and fractionating the cracked product, said fraction being composed essentially of $C_5$, $C_6$ and $C_7$ hydrocarbons comprising aromatic hydrocarbons, olefinic hydrocarbons and conjugated diene hydrocarbons, the conjugated diene hydrocarbons comprising at least about 15% by weight of the fraction, with sulfur trioxide, in mol ratio of about 0.75 to 2.5 mols of sulfur trioxide per mol of synthetic

| Resin, M. Wt. 390 | | $SO_3$ | | Hexane (Gms.) | Time (Minutes) | | Temp., °C. | Titration [1] | Yield [2] |
|---|---|---|---|---|---|---|---|---|---|
| Gms. | Mols | Gms. | Mols | | Sulfonation | Digestion | | | |
| 117 | 0.3 | 12 | 0.15 | 250 | 8 | 60 | 25–35 | 38 | 15 |

[1] Milliequivalents of acidity as sulfonic acid compound per 100 grams resin fed.
[2] Sulfonic acid compound (mol percent).

Examples 6 and 7 show that sulfonation of synthetic petroleum resins having molecular weights substantially below the minimum called for by the present invention resulted in poor product yields.

petroleum resin, at temperature of about 10° to 80° C. for a time sufficient to complete the reaction.

4. The process of preparing oil-soluble sulfonate salts which comprises reacting a synthetic petroleum resin having a molecular weight of at least about 1000, said resin being formed by aluminum chloride catalyzed polymerization of a highly unsaturated liquid fraction obtained by cracking a liquid petroleum oil and fractionating the cracked product, said fraction being composed essentially of $C_5$, $C_6$ and $C_7$ hydrocarbons comprising aromatic hydrocarbons, olefinic hydrocarbons and conjugated diene hydrocarbons, the conjugated diene hydrocarbons comprising at least about 15% by weight of the fraction, with a sulfonating agent, in mol ratio of about 0.75 to 2.5 mols of sulfonating agent per mol of resin, at temperature of about 10° to 80° C. for a time sufficient to complete the reaction, separating the sulfonated product and neutralizing the separated sulfonated product.

5. The process of preparing oil-soluble sulfonates which comprises reacting a synthetic petroleum resin having a molecular weight of at least about 1000, said resin being formed by aluminum chloride catalyzed polymerization of a highly unsaturated liquid fraction obtained by cracking a liquid petroleum oil and fractionating the cracked product, said fraction being composed essentially of $C_5$, $C_6$ and $C_7$ hydrocarbons comprising aromatic hydrocarbons, olefinic hydrocarbons and conjugated diene hydrocarbons, the conjugated diene hydrocarbons comprising at least about 15% by weight of the fraction, with a sulfonating agent in the presence of an inert solvent, in mol ratio of about 0.75 to 2.5 mols of sulfonating agent per mol of resin, at temperature of about 10° to 80° C. for a time sufficient to complete the reaction.

6. The process of preparing oil-soluble sulfonate salts which comprises reacting a synthetic petroleum resin having a molecular weight of at least about 1000, said resin being formed by aluminum chloride catalyzed polymerization of a highly unsaturated liquid fraction obtained by cracking a liquid petroleum oil and fractionating the cracked product, said fraction being composed essentially of $C_5$, $C_6$ and $C_7$ hydrocarbons comprising aromatic hydrocarbons, olefinic hydrocarbons and conjugated diene hydrocarbons, the conjugated diene hydrocarbons comprising at least about 15% by weight of the fraction, with sulfur trioxide in the presence of an inert solvent, in mol ratio of about 0.75 to 2.5 mols of sulfur trioxide per mol of synthetic petroleum resin, at temperature of about 10° to 80° C. for a time sufficient to complete the reaction, separating the sulfonated product and neutralizing the separated sulfonated product.

References Cited in the file of this patent

UNITED STATES PATENTS

| | | |
|---|---|---|
| 2,216,257 | Vogt | Oct. 1, 1940 |
| 2,447,762 | Macuga | Aug. 24, 1948 |
| 2,469,472 | Nachod | May 10, 1949 |